United States Patent
Ruano

(10) Patent No.: US 6,729,880 B1
(45) Date of Patent: May 4, 2004

(54) DIFFERENT FEATURES OF THE GLOBE

(76) Inventor: Jose Ruano, 5022 W. Drummond, Chicago, IL (US) 60639

( * ) Notice: Subject to any disclaimer, the term of this patent is extended or adjusted under 35 U.S.C. 154(b) by 0 days.

(21) Appl. No.: 10/442,883

(22) Filed: May 20, 2003

Related U.S. Application Data

(60) Provisional application No. 60/383,667, filed on May 29, 2002.

(51) Int. Cl.⁷ ............................................. G09B 27/08
(52) U.S. Cl. ...................................... 434/131; 434/147
(58) Field of Search .................. 434/131, 132, 434/136, 147, 133, 130

(56) References Cited

U.S. PATENT DOCUMENTS

| | | | |
|---|---|---|---|
| 888,854 A | | 5/1908 | Sheldon |
| 2,029,252 A | * | 1/1936 | Pinaud ........................ 434/131 |
| D243,201 S | * | 1/1977 | Wrenn ........................ D11/166 |
| 4,595,367 A | | 6/1986 | Forsyth |
| 5,033,965 A | * | 7/1991 | Chiu et al. ................... 434/131 |
| 5,132,943 A | * | 7/1992 | Davies ........................... 368/21 |
| 5,441,261 A | * | 8/1995 | Margolis et al. ......... 273/157 R |
| 5,931,677 A | * | 8/1999 | Rifat et al. ................... 434/131 |
| 6,027,343 A | * | 2/2000 | Ho ............................... 434/131 |
| 6,500,005 B2 | * | 12/2002 | Akkashian ................... 434/131 |
| 6,612,843 B1 | * | 9/2003 | Riggs .......................... 434/131 |
| 6,651,364 B2 | * | 11/2003 | Hermanson et al. ........... 40/409 |

* cited by examiner

Primary Examiner—Kurt Fernstrom
(74) Attorney, Agent, or Firm—Matthew J. Peirce

(57) ABSTRACT

A display globe is disclosed. The display globe would have flags overlaying the surface area of all the countries rather than displaying mountains, land features, cities, states, or other geographical indications that are typically present with a normal globe. The actual borders of these countries, and all other countries, would be observed, which would cause some cropping of each country's respective flag to occur. However, the display globe would provide an invaluable teaching tool for use with individuals, and especially children, in learning flags of existing countries.

2 Claims, 2 Drawing Sheets

DIFFERENT FEATURES OF THE GLOBE

This application claims benefit of provisional application No. 60/383,667 filed May 29, 2002.

I. BACKGROUND OF THE INVENTION

The present invention concerns that of a new and improved display globe.

II. DESCRIPTION OF THE PRIOR ART

U.S. Pat. No. 5,931,677, issued to Rifat, discloses an educational illuminated globe with means to indicate political boundaries and cites.

U.S. Pat. No. 4,595,367, issued to Forsyth, discloses an instructional globe that represents major geological features.

U.S. Pat. No. 888,854, issued to Sheldon, discloses a jacket for a globe structure and is provided for general interest in the art.

III. SUMMARY OF THE INVENTION

The present invention concerns that of a new and improved display globe. The display globe would have flags overlaying the surface area of all the countries rather than displaying mountains, land features, cities, states, or other geographical indications that are typically present with a normal globe. The actual borders of these countries, and all other countries, would be observed, which would cause some cropping of each country's respective flag to occur. However, the display globe would provide an invaluable teaching tool for use with individuals, and especially children, in learning flags of existing countries.

There has thus been outlined, rather broadly, the more important features of a display globe that the detailed description thereof that follows may be better understood and in order that the present contribution to the art may be better appreciated. There are, of course, additional features of the display globe that will be described hereinafter and which will form the subject matter of the claims appended hereto.

In this respect, before explaining at least one embodiment of the display globe in detail, it is to be understood that the display globe is not limited in its application to the details of construction and to the arrangements of the components set forth in the following description or illustrated in the drawings. The display globe is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present display globe. It is important, therefore, that the claims be regarded as including such equivalent constructions insofar as they do not depart from the spirit and scope of the present invention.

It is therefore an object of the present invention to provide a display globe which has all of the advantages of the prior art and none of the disadvantages.

It is another object of the present invention to provide a display globe which may be easily and efficiently manufactured and marketed.

It is another object of the present invention to provide a display globe which is of durable and reliable construction.

It is yet another object of the present invention to provide a display globe which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Priority is hereby claimed to application Ser. No. 60/383,667, filed on May 29, 2002.

Figure 1:
FIG. 1 shows a side view of the display globe.

FIG. 1 shows a side view of the display globe 2. Display globe 2 would be a new and improved globe that would have flags overlaying the surface area of all the countries rather than displaying mountains, land features, cities, states, or other geographical indications that are typically present with a normal globe.

In FIG. 1, the countries of The United States 3 and Canada 5 are shown with the primary features of their respective flags. The actual borders of these countries, and all other countries, would be observed, which would cause some cropping of each country's respective flag to occur. Obviously, this will cause some countries to have much smaller flag representations than other countries, especially in those with small land mass. The presence of the primary features of each country's flag, however, would greatly assist individuals, and especially children, in learning the different flags of all the countries in the world.

Figure 2:
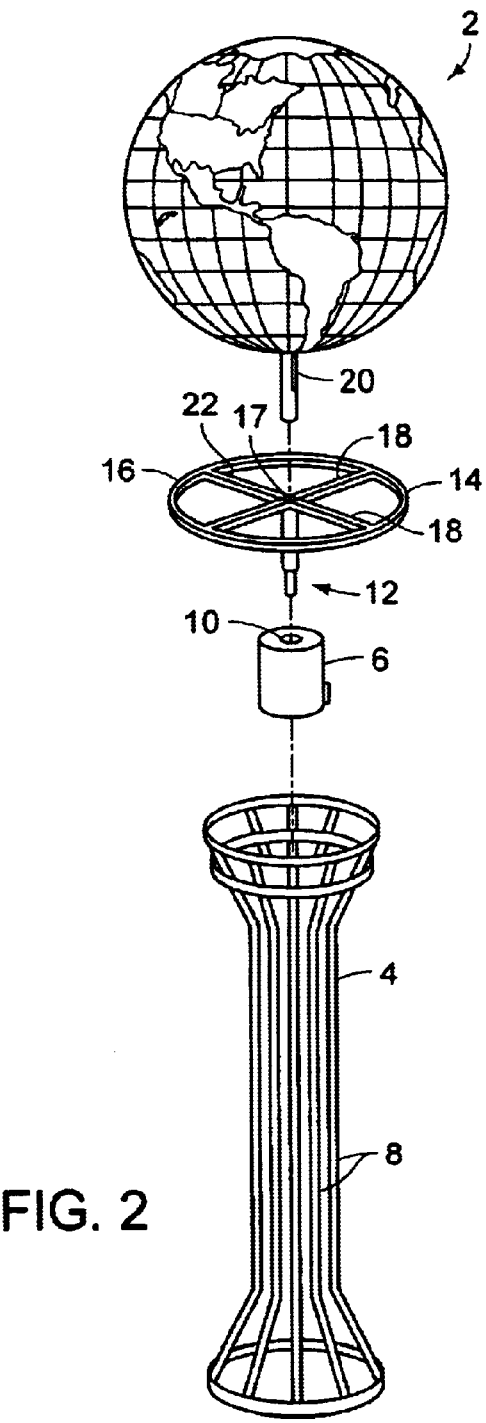
FIG. 2 shows a side view of the various parts of the display globe.

FIG. 2 shows a side view of various parts of the display globe 2. Globe 2 would be supported by a primary stand 4 which would have two ends, a top end and a bottom end, with a motor 6 mounted within the primary stand 4 near the top end of the primary stand 4. The stand 4 would comprise a plurality of individual supports 8. Motor 6 itself would be cylindrically-shaped and would have two surfaces, a top surface and a bottom surface, with each of the surfaces being flat. Motor 6 has a hole 10 that is centrally located on the top surface of motor 6.

Globe support 14 has two surfaces, a top surface and a bottom surface, and comprises a top-mounted ring 16, a plurality of connectors 18, a center support 17, and a central pole 12. Center support 17 has two surfaces, a top surface and a bottom surface. Central pole 12 has two ends, a top end and a bottom end, with the top end being attached to the bottom surface of center support 17 and inserted into the hole 10 of motor 6. Globe 2, when the present invention is functioning, rests on ring 16 of globe support 14. Ring 16 is attached to the center support 17 by the plurality of connectors 18, with each connector 18 having two ends, an inner end and an outer end. The outer end of each connector is attached to the ring 16, while the inner end of connector 18 is attached to the center support 17.

Globe 2 itself would have a bottom-mounted central pole 20 for insertion in hole 22, which would be located on the top end of central pole 12. Pole 20 would preferably be attached to the globe 2 at the location where the South Pole would be located. When globe support 14 and globe 2 would be properly mounted on motor 6, motor 6 would not rotate but would cause globe support 14 and globe 2 to slowly rotate in a circular manner by rotating the central pole 20. Bearings 30 and 32 within central pole 12 assist in allowing central pole 12 to rotate effectively.

Figure 3:
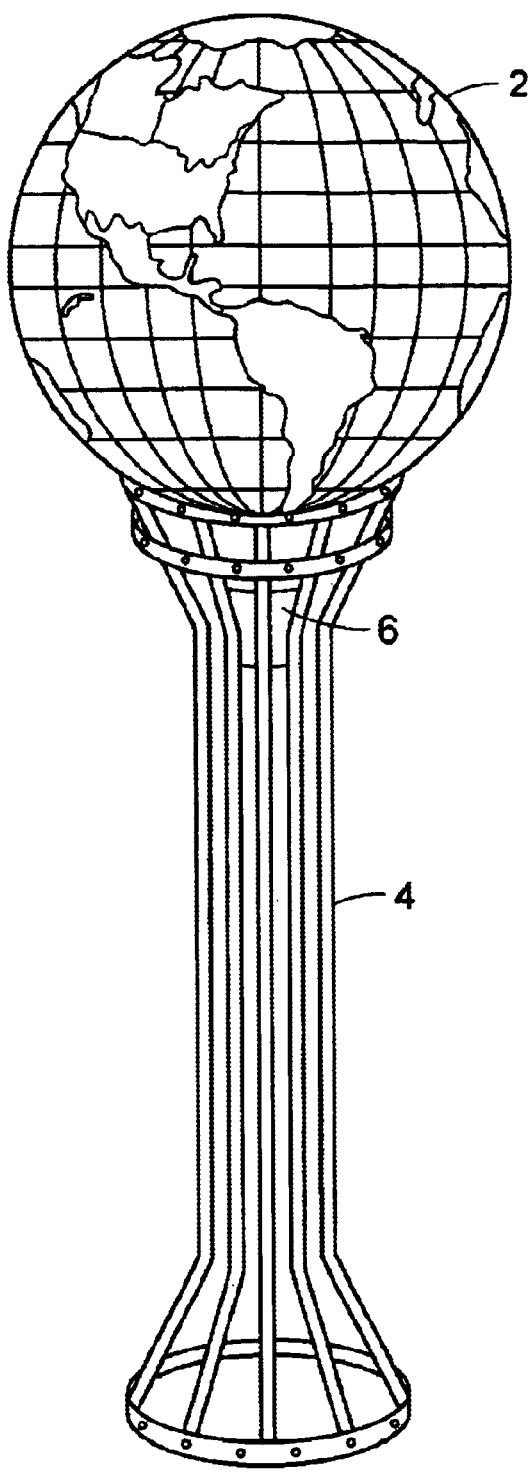
FIG. 3 shows a perspective view of the display globe as it would appear in use.

FIG. 3 shows a perspective view of the display globe 2 as it would appear in use.

What I claim as my invention is:

1. An apparatus for assisting an individual in learning flags of countries of the world, the apparatus comprising:
   (a) a primary stand having two ends, a top end and a bottom end,
   (b) a motor attached to the primary stand near the top end of the primary stand, the motor having a cylindrical shape, the motor having two surfaces, a top surface and a bottom surface, each of the surfaces being flat,
   (c) a mounting hole located on the top surface of the motor,
   (d) a globe support having two surfaces, a top surface, and a bottom surface, the globe support comprising
      (i) a center support having two surfaces, a top surface and a bottom surface,
      (ii) a plurality of connectors, each connector having two ends, an inner end and an outer end, the inner end of each connector connected to the center support,
      (iii) a ring attached to the second end of each of the connectors of the plurality of connectors,
      (iv) a central pole having two ends, a top end and a bottom end, the top end of the central pole attached to the bottom surface of the center support,
      (v) wherein the bottom end of the central pole is inserted into the mounting hole on the top surface of the motor,
   (e) a globe placed on the top surface of the globe support,
   (f) representations of the countries of the world placed on the globe,
   (g) wherein the motor slowly rotates the globe in a continuous manner.

2. An apparatus for assisting an individual in learning flags of countries of the world according to claim 1 wherein each representation of a country of the world placed on the globe includes primary features of the flag of the respective country.

* * * * *